US010954920B2

(12) United States Patent
Botwright et al.

(10) Patent No.: US 10,954,920 B2
(45) Date of Patent: Mar. 23, 2021

(54) TRANSPORT FRAME FOR A WIND TURBINE BLADE (71) Applicant: Vestas Wind Systems A/S, Aarhus N. (DK)

(72) Inventors: Adrian Botwright, Sabro (DK); Michael Kastrup, Ebeltoft (DK); Troels Vahle, Grenaa (DK); Jacob Antonsen, Aarhus N. (DK); Kristoffer Lolk Fredriksen, Aarhus N. (DK)

(73) Assignee: Vestas Wind Systems A/S, Aarhus N. (DK)

( * ) Notice: Subject to any disclaimer, the term of this patent is extended or adjusted under 35 U.S.C. 154(b) by 294 days.

(21) Appl. No.: 16/067,200

(22) PCT Filed: Dec. 28, 2016

(86) PCT No.: PCT/DK2016/050472
§ 371 (c)(1),
(2) Date: Jun. 29, 2018

(87) PCT Pub. No.: WO2017/114536
PCT Pub. Date: Jul. 6, 2017

(65) Prior Publication Data
US 2019/0024636 A1    Jan. 24, 2019

(30) Foreign Application Priority Data
Dec. 30, 2015   (GB) .................................... 1523125

(51) Int. Cl.
*F03D 13/40* (2016.01)
*B65D 85/64* (2006.01)
(Continued)

(52) U.S. Cl.
CPC ............... *F03D 13/40* (2016.05); *B60P 3/40* (2013.01); *B65D 85/62* (2013.01); *B65D 85/64* (2013.01); *B65D 88/129* (2013.01); *B61D 3/16* (2013.01)

(58) Field of Classification Search
CPC .......... F03D 13/40; B60P 1/6481; B60P 3/40; B65D 88/129; B65D 85/62; B65D 85/64; B61D 3/16
(Continued)

(56) References Cited

U.S. PATENT DOCUMENTS 8,622,670 B2 *   1/2014   Vitor ....................... F03D 13/40
                                                              410/120
2010/0252977 A1   10/2010   Jorgensen et al.
(Continued)

FOREIGN PATENT DOCUMENTS

DE    3147283 A1    6/1983
EP    2133558 A2    12/2009
(Continued)

OTHER PUBLICATIONS

Japanese Patent Office, Notice of Reasons for Refusal in JP Application No. 2018-534859, dated Aug. 27, 2019.
(Continued)

Primary Examiner — Stephen T Gordon
(74) Attorney, Agent, or Firm — Wood Herron & Evans LLP (57) ABSTRACT Transport frame and method; the transport frame having a longitudinal, lateral and upright extent, and configured for transporting a root end or tip portion of a longitudinally extending wind turbine blade, the frame being stackable with similar frames, the frame having four top shoulders and four feet, the feet of the frame being conformed to be stackable on corresponding shoulders of another similar
(Continued)

frame, wherein each shoulder is provided with a locating finger, each finger having a height above the shoulder, and wherein each foot is provided with a recess conformed to receive a locating finger, and wherein a first locating finger has a height greater than each of the three remaining locating fingers.

18 Claims, 8 Drawing Sheets

(51) Int. Cl.
    *B60P 3/40*     (2006.01)
    *B65D 88/12*     (2006.01)
    *B65D 85/62*     (2006.01)
    *B61D 3/16*     (2006.01)

(58) Field of Classification Search
    USPC .................. 410/32–36, 42, 44, 45, 120, 155
    See application file for complete search history.

(56) References Cited

U.S. PATENT DOCUMENTS

2014/0124468 A1     5/2014   Lundrigan et al.
2016/0053740 A1     2/2016   Landrum et al.

FOREIGN PATENT DOCUMENTS

| | | |
|---|---|---|
| EP | 2239459 A2 | 10/2010 |
| EP | 2418376 A1 | 2/2012 |
| EP | 2487363 A1 | 8/2012 |
| EP | 2628945 A2 | 8/2013 |
| EP | 2708731 A2 | 3/2014 |
| EP | 2796709 A1 | 10/2014 |
| JP | 2009173289 A | 8/2009 |
| WO | 9528297 A1 | 10/1995 |
| WO | 0069756 A1 | 11/2000 |
| WO | 03076307 A1 | 9/2003 |

OTHER PUBLICATIONS

China National Intellectual Property Administration, First Notification of Office Action in CN Application No. 201680082819_072919.

European Patent Office, International Search Report and Written Opinion in PCT Application No. PCT/DK2016/050472, dated Mar. 31, 2017.

Intellectual Property Office, Search Report in GB1523125.1, dated Jul. 8, 2016.

\* cited by examiner

TRANSPORT FRAME FOR A WIND TURBINE BLADE

The present invention relates to the field of storage, transportation and handling of large elongate objects, in particular wind turbine blades and frames therefor.

In this context, a special set of logistical requirements interacts with a wide variety of technical and cost constraints, to pose technical challenges for effective or optimal solutions. The ever-increasing size and weight of individual blades adds to these challenges. In general, it may be said that after their construction, wind turbine blades undergo a series of handling and storage stages from their production site to their installation location. These stages may include initial storage at a production site, transportation from a production site to an installation site or to an interim storage or marshalling site. There may be further transportation between one or more interim storage or marshalling sites to an installation site. Each interim storage stage may include transferring steps in which blades are lifted off a first transportation platform and on to another. One or more transport stages may include sea transport, or rail or truck transport. Storage and handling solutions are sometimes optimised for individual stages of the transition between production and installation. To that end, there may be provided a whole range of support or storage solutions, each individually configured for a particular storage or transport stage and requiring repeated switching between different storage or transport structures. This is costly, time-consuming and can increase the tendency to inflict damage or wear on blades. There can be many advantages arising from devising a blade handling solution which facilitates multiple stages of the transportation process as a whole, including interim storage stages.

The present invention seeks to provide an effective wind turbine blade transport and handling solution which addresses the needs to ensure damage-free transportation of the blades, quick handling during transfers whether between transport platforms or between storage and transportation stages, as well as safety and ease of use by personnel. In aspects, special consideration has been given towards transportation by shipping. In aspects, special consideration has been given towards both ensuring secure retention and support of blades in transport frames, and to simplifying operations and procedures such as lifting operations.

Wind turbine blade support and transportation devices are known in which a frame element is applied at a blade root while another co-operating frame element is provided outboard of a blade root region, often in a mid- or tip region. These may be referred to as root- and tip frames respectively. In some cases, these may be stackable thereby allowing several blades to be supported lying more or less horizontal or slightly inclined, and stacked atop one another. EP2708731 recites stackable wind turbine blade frames in which each frame is provided at its upper and lower corners with ISO container corner castings. These ensure that the transport frames can be lifted. Moreover, it is known in the art to stack containers atop one-another, in particular using twistlock elements interposed between adjacent corner castings in a stack. EP2796709 discloses transport and storage fittings for a wind turbine blade with a set of root and tip storage fittings for storing a blade in one pitch orientation. The frames may be stacked atop one another with the help of locating mountings. According to that document, lifting of a transport frame is by means of a crane connected to additionally provided lifting eyelets.

It would be desirable to provide a transport frame design which would enable quick and easy stacking operations. It would be desirable to improve lifting operations while at the same time ensuring secure transportation in a stacked arrangement, especially during shipping. Furthermore, it would be desirable to enable lifting of multiple blades in a stack. It would be especially desirable to provide such a solution for use in connection with larger blades, especially offshore blades. It has previously been suggested in EP2487363 to lift a stack of blades as a pack by lifting them from beneath.

The present invention sets out to provide improvements to known blade transport frames with a view in particular to ensuring easy usage by operators, quick and reliable stacking and transportation in a stacked configuration as well as a simplified arrangement for lifting blades in a stack.

SUMMARY OF THE INVENTION

To these and other ends, the present invention provides a transport frame. Further optional features thereof are described in the present specification and drawings.

Accordingly, there is provided a transport frame having a longitudinal, lateral and upright extent, and configured for transporting a root end or tip portion of a longitudinally extending wind turbine blade. The frame is securely stackable with similar or identical frames. The frame has four top shoulders, preferably at or near four top corners thereof, and four feet, preferably at or near four bottom corners thereof. The feet of the frame are conformed to be stackable on corresponding shoulders of another, preferably similar or identical frame. Each shoulder is provided with a preferably upwardly protruding locating finger, each said finger having a height above said shoulder, and wherein each said foot is provided with a recess conformed to receive a said locating finger. Furthermore, a first locating finger has a height greater than each of the three remaining locating fingers. This arrangement facilitates stacking of one frame on top of another because a stacking operator merely has to align a single aperture with a single finger before comparatively easily positioning the remainder of the apertures in an appropriate position for lowering a frame to be stacked on a frame beneath it.

Preferably, a second locating finger may have a height less than the first locating finger, and greater than each of two remaining locating fingers. This feature still further speeds up the process of aligning frames to be stacked. With frames becoming increasingly large, the task of aligning two frames to be stacked becomes increasingly awkward since the frames typically hang from a crane and ned to be pushed and swung into position, which is not easy for large objects with high mass and inertia.

Preferably, the first and second locating fingers are arranged at diagonally opposite shoulders of said frame. This arrangement still further facilitates stacking because the easiest subsequent finger and recess pair to align after a first successful alignment is that pair which is diagonally opposite. Optionally, one or more locating fingers may be tongue-shaped, having two faces defining a thickness and a breadth. Optionally, the breadth of the finger may narrow towards a truncated point. Optionally, any finger may preferably be bevelled from both faces across its thickness.

Advantageously, at least two or more or each said finger may be provided with a lifting aperture configured as a load bearing lifting point for lifting a frame or a stack of frames. Such an arrangement may enable an especially quick connection between a lifting element such as a yoke, a sling, a spreader or other, to be connected to the frame or frame stack.

In embodiments, one or more or each finger may include an anchor portion extending below said shoulder, into a strut of said frame. This will strengthen a locating finger to allow lifting of larger frames and blades preferably using the lifting point at said finger.

Preferably, a locating finger may include an abutment at a base thereof, the abutment rising above said shoulder. Additional locating elements at a frame shoulder may enhance the resistance to shear loads especially during transportation. To this end, preferably, a recess may be configured to receive a said finger and said abutment in a locating engagement and said recess may have a mouth conformed to said abutment. Optionally, the abutment and said mouth may be circular, although any shape may be suitable provided the recess, or mouth, and the abutment are conformed to fit each other, with the recess preferably fitting over and around the abutment.

In embodiments, a breadth of a finger at a point thereof may be less than a diameter of a said mouth in a foot of a frame to be stacked, and preferably wherein a breadth of said finger at a base thereof may be is substantially equal to a diameter of said mouth. Other tolerances may be preferred such as a comparatively loose fit, serving primarily to locate a frame foot atop another frame's shoulder. In alternative embodiments a close fit may be desirable in order to improve resistance to shear stresses on a stack of frames.

Optionally, the frame may additionally include a stacking connector which may be in the form of a connector arm, preferably a retractable connector arm, and a stacking connector abutment, which may be in the form of a clamping claw. The stacking connector may be configured for locking stacked frames together, said stacking connector and said abutment preferably being additional to and separate from said locating finger and said recess. This arrangement provides two alternative connection systems at a blade frame. The locating fingers may allow easy locating and stacking, as well as, optionally, lifting an individual frame or a topmost frame of a stack.

In embodiments, the stacking connector may comprise a retractable arm arrangement proximate one or more said top or bottom corner of a frame. Furthermore, the frame may further comprise, proximate at least one other top or bottom corner thereof, a clamping claw arrangement. Preferably, the retractable arm arrangement may be configured to fixingly engage a corresponding claw arrangement at an adjacent similar or identical frame in a stacked arrangement of the frames. Preferably, a retractable arm and a clamping claw comprise a tensioner capable of creating a fixed engagement between them under tension. This arrangement ensures a connection under tension between frames in a stack, thereby giving additional stability to the stack. This improves stability during transportation.

In embodiments, a retractable arm arrangement may comprise a gang of two or more, preferably three or four retractable arms. Correspondingly, a clamping claw arrangement may also comprise two or more clamping claws or three or four claws, in particular a same number of claws as retractable arms. A greater number of arms may allow a higher level of tension to be applied across stacked frames thereby further improving overall stability and resilience of a stack.

Preferably, each retractable arm at the retractable arm arrangement may be individually movable into engagement with a corresponding clamping claw at the clamping claw arrangement.

In a still further aspect, the invention provides a method. Further preferred features of a method according to aspects of the invention are further described herein.

Accordingly, there is provided a method of stacking a wind turbine blade transport frame on a similar or identical wind turbine blade transport frame.

The method includes positioning a first frame on a surface and lowering a second frame from above it, thereafter bringing a first locating finger of the first frame into loose engagement with a first recess at a foot of the second frame, and thereafter bringing remaining locating fingers of the first frame into engagement with remaining recesses at a foot of the second frame.

Optionally, the method may further include bringing a second locating finger of the first frame into loose engagement with a second recess at a foot of the second frame and thereafter bringing remaining locating fingers of the first frame into engagement with remaining recesses at a foot of the second frame.

The method may optionally further include engaging a stacking connector of a first frame with a stacking connector abutment on a second frame to thereby secure the first and second frame in a stacking connection. The method may advantageously further include lifting a stack of two, three or more said frames by connecting only the topmost one of the stacked frames with a lifting device and then lifting the stack, wherein each frame in each frame stack is suspended from and lifted by the frame immediately above it. This arrangement may be highly advantageous because—for a stacked lift—it neither requires onerous connection of a lifting element to a frame of a stack, nor does it require additional elements over and above those elements in use during stacked transportation. Stacked lifting may considerably reduce capital outlay during transportation and handling by reducing idle time such as waiting or loading/unloading time of capital equipment such as large transporters or cranes. It may also reduce the amount of marshalling space needed for certain operations.

In particular, the method may include lifting two, or three or more stacked blades, each in a pair of blade frames (being a root and a tip frame) by this method, including simultaneously lifting a pair of said stacks of frames by connecting a top frame of each respective stack with a lifting device.

Still further advantageously, there may be provided a method of lifting a wind turbine blade frame or stack of said frames as set forth hereinabove and wherein in particular the frame may comprise a wind turbine blade. The method may include connecting a lifting element to two or more load bearing lifting apertures at a locating finger and lifting the frame or stack of frames suspended by the load bearing lifting apertures.

Additional aspects of the invention including various optional features thereof will be explained with reference to the following non-limiting examples including the following drawings in which.

Figure 1:
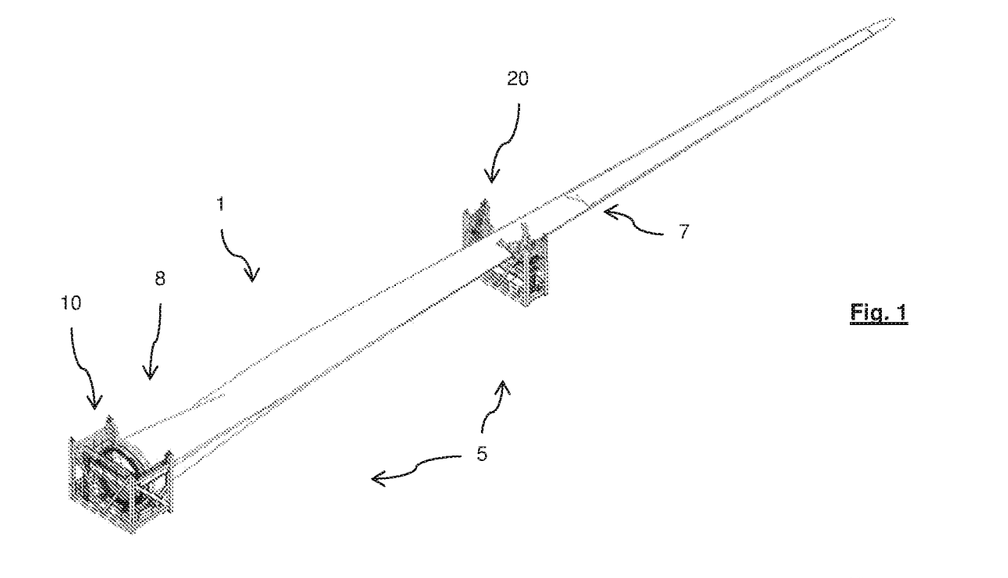
FIG. 1 shows a transport frame pair supporting a wind turbine blade.
Figure 2:
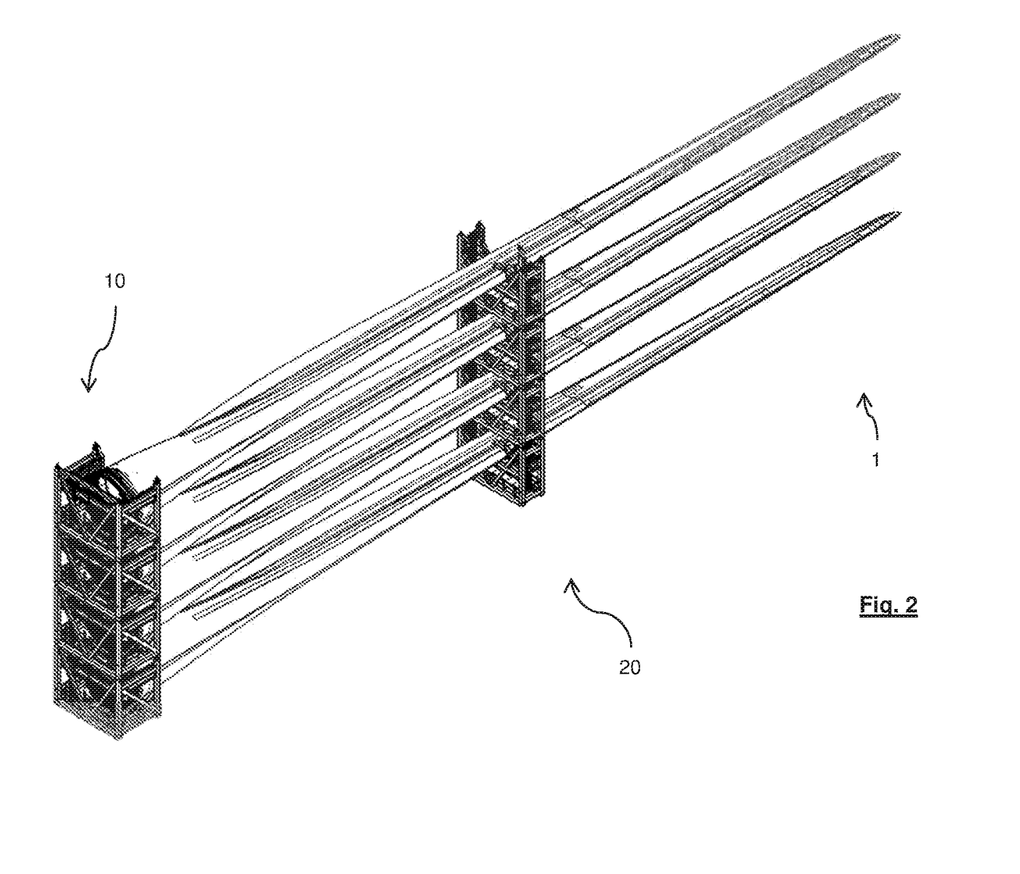
FIG. 2 shows several stacked wind turbine blades supported in a stack of frame pairs.

FIG. 1 illustrates a frame pair consisting of a transport frame 5 in the form of a root frame 10 and a transport frame 5 in the form of a tip frame 20 with a wind turbine blade 1 supported therein in a generally horizontal orientation. A chordwise direction of the blade 1 may also lie generally horizontal when supported in the respective transport frames 5. As is generally understood, the blade 1 extends from a root end to a tip end which may also be correspondingly referred to as a proximal and a distal end respectively. The frames of the frame pair are stackable, as illustrated in FIG. 2. Each root and tip frame 10, 20 includes a respective root saddle assembly 80 and tip saddle assembly 50 as will be described more fully below. In the design illustrated here, each tip and root frame includes a single respective tip- or root saddle assembly 50, 80. Associated with the respective saddle assembly are additional elements for keeping the respective blade root region 8 or tip region 7 securely in place in the respective frame 10, 20. For the purposes of the present context, the tip region 7 may also denote a mid-region of a blade 1. Expressed differently, a tip frame 20 may be positioned anywhere between a mid- and a tip-region 7 of a blade 1.

FIG. 2 illustrates a stacked arrangement of multiple blades 1, with each blade supported in a frame pair 10, 20. The stacked arrangement is achieved by stacking the respective root frames 10 on top of each other and the tip frames 20 likewise. To that end, each of the tip frames 20 and root frames 10 is constructed accordingly, as can be seen for example from FIGS. 3 to 5. Preferably, the frame construction in each case includes rigidly connected frame struts, including upright struts 71, 72, 91, 92 extending between a respective root or tip frame base 75, 95 and a respective root or tip frame top 76, 96. Preferably, these respective upright struts 71, 72, 91, 92 may define respective upright extending corner edges of each transport frame 5, extending between respective corners 17. Preferably therefore, respective upright struts may be provided in pairs of proximal upright struts 71, 91 and distal upright struts 72, 92. Lateral struts 74, 94 extend rigidly between upright struts 71, 91, 72, 92, thereby define a respective proximal frame portion and a distal frame portion. Lengthwise struts 73, 93 longitudinally connect respective proximal and distal frame portions. In the example illustrated, lengthwise struts 73, 93 extend between proximal upright struts 71, 91 and distal upright struts 72, 92 or between respective proximal and distal lateral struts 74.

The respective frame struts of the tip or root frame 20, 10 thereby define a three dimensional interior space. In the example illustrated here, the tip- and root frame 20, 10 each defines an approximately cuboid interior space inside which a respective tip saddle assembly 50 or root saddle assembly 80 is accommodated. The base 75, 95 of the tip and root frames 20, 10 may describe a substantially rectangular footprint in a lateral and longitudinal plane of the frame.

Figure 3:
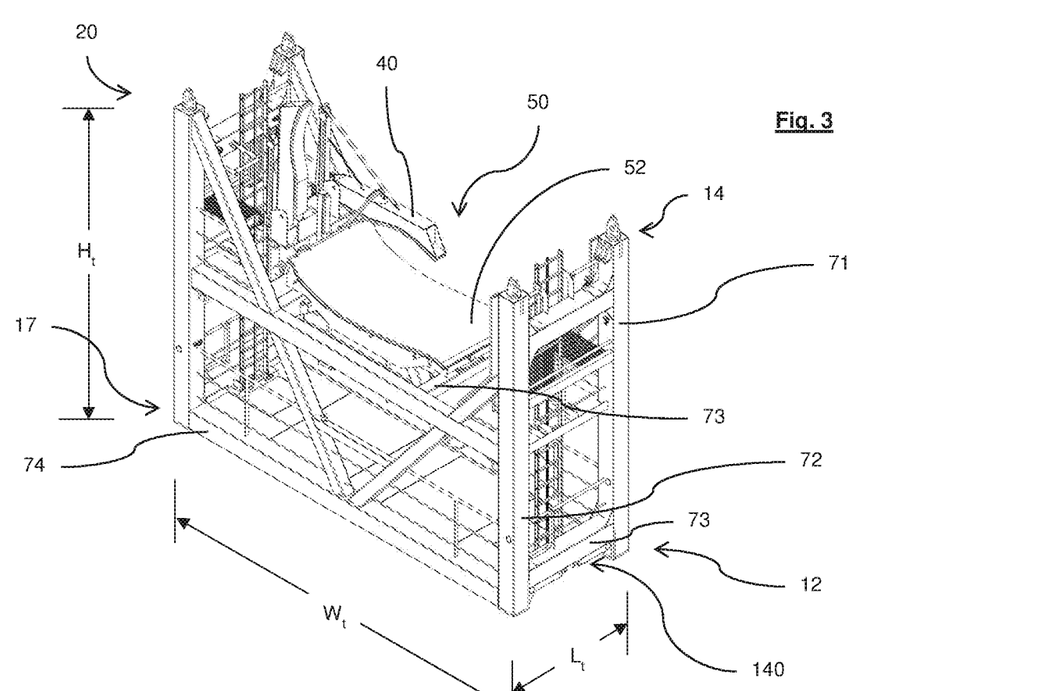
FIG. 3 shows a perspective view of a transport frame which is a tip frame.
Figure 5:
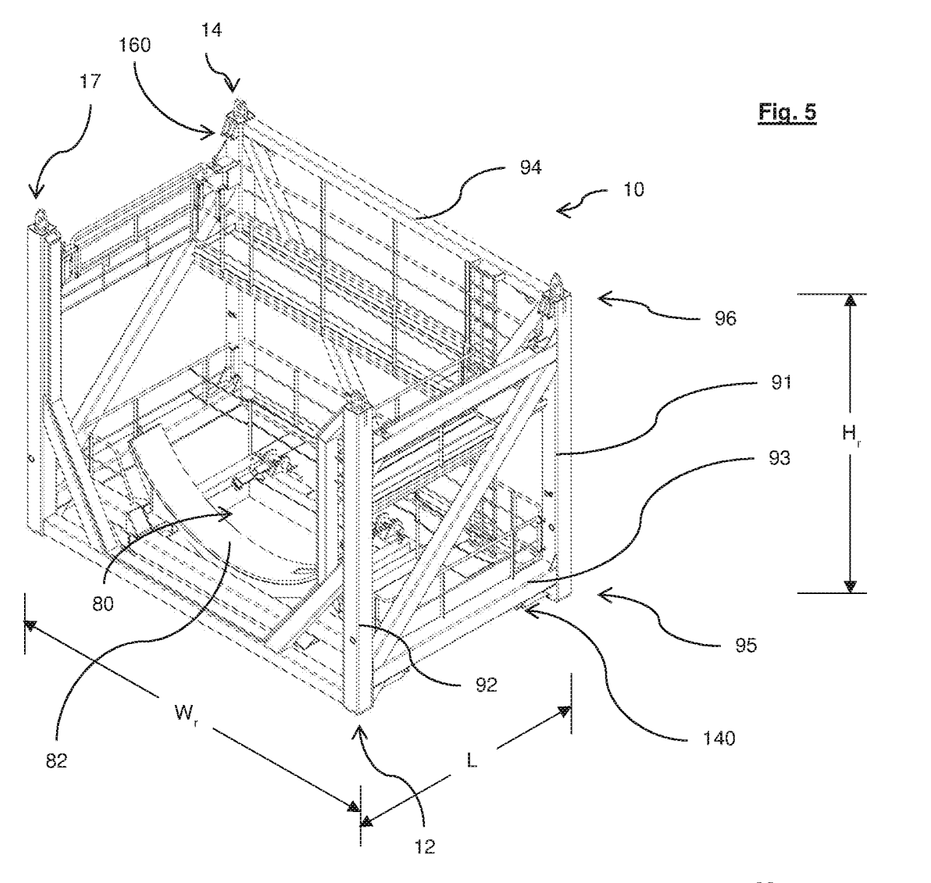
FIG. 5 shows a perspective view of a root frame.

As can be seen from the tip frame 20 illustrated in FIG. 3 and the root frame 10 illustrated in FIG. 5, each frame exhibits a height extent H, a lateral extent W and a lengthwise extent L.

At the top 76, 96 of each tip or root frame 20, 10 there may be provided locating fingers 36 which may co-operate with a recess (not visible in these drawings) at the bottom 75, 95 of the relevant frame. Necessarily, a recess or finger 36 of a first tip or root frame 20, 10 will co-operate to facilitate stacking with the corresponding finger 36 or recess of a similar frame to be stacked atop or beneath.

Stacking frames for storage or stowage, as well as transferring frames off from stacks or onto stacks is made easier when the effective height dimension $H_t$ of the tip frame 20 of a frame pair is equal to or substantially equal to the effective height $H_r$ of the root frame 10. In this context, the effective height of a frame may correspond to be the distance from a contact surface beneath the frame base 75, 95 on which the frame may rest in e.g. a storage or stowage or transport situation, to the frame top 76, 96, on which a superposed, stacked frame will rest. Preferably, also the effective width dimension $W_t$ of the tip frame 20 of a frame pair may be equal to or substantially equal to the effective width $W_r$ of the root frame 10. In the present context, the effective width of a frame 5 may correspond to the distance between the outermost surface of a proximal 72, 92 or distal 71, 91 pair of upright struts.

Figure 4:
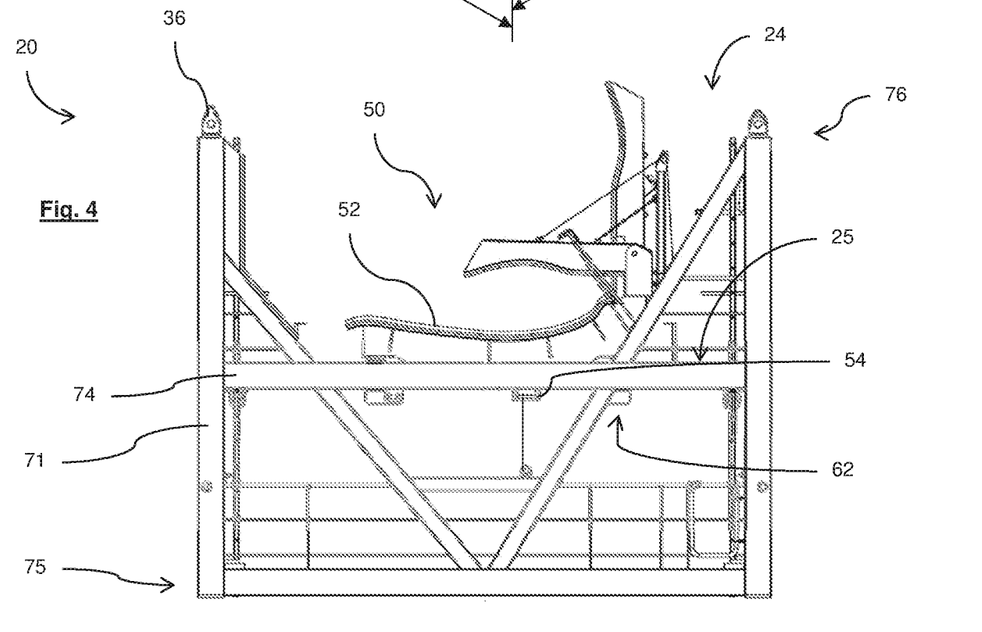
FIG. 4 shows a side view of a transport frame which is a tip frame.

FIGS. 3 and 4 show a tip saddle assembly 50 within tip frame 20. The tip saddle assembly 50 comprises a saddle 52 and a saddle support 62. The tip saddle 52 may be configured with a support surface shaped to conform to the shape of a blade surface towards its tip, e.g. in a mid- or tip region thereof. In the illustrated embodiments, the tip saddle is configured to extend between a blade trailing edge 3 and a blade leading edge 2. As can better be seen from FIG. 3, the tip saddle assembly 50 may be supported on longitudinally extending frame struts 73. In particular, the tip saddle support 62 may be supported on longitudinally extending frame struts 73. Preferably, the tip saddle 52 may be slidable in translation in a lengthwise direction of the tip frame 20. This in effect corresponds to a movement of the tip saddle 52 in a lengthwise direction of the blade. Preferably, the tip saddle 52 is capable of sliding freely in the aforementioned lengthwise direction.

Also shown in FIGS. 3-4 are clamping arms 40 for securing the blade mid- or tip-end on the tip saddle 52 in the tip saddle assembly 50. According to aspects of the invention, one or more such clamping arms 40 may be provided in connection with a tip saddle assembly 50, in particular as part thereof. In the example shown, two clamping arms 40 are provided in association with each transport frame 5, in particular, associated with each tip saddle 52 and tip saddle assembly 50. A clamping arm 40 may be opened to allow insertion or removal of a blade 1 into or from a tip frame 20. A clamping arm 40 may be closed to keep the blade in place. In aspects of the invention, a first and a second clamping arm 40 may be provided mounted at a proximal end thereof to a single tip saddle assembly 50, preferably at a hinge point. Preferably, In FIG. 3, a proximal clamp arm 40 is shown closed, while a distal clamp arm 40 is shown open for illustrative purposes. A raising and lowering apparatus may be provided for operating the clamping arms 40. The provision of more than one clamping arm 40 at a tip saddle assembly may allow for larger blades to be effectively clamped in a tip saddle assembly 50 while at the same time keeping each clamping arm 40 down to a size and weight such as to allow manual operation by an operator, preferably using tools such as hand tools and preferably not using power or powered tools.

FIGS. 1 and 2 illustrate a blade 1 with its root portion 8 in a root transport frame 10 and a blade mid-portion 7 in a tip transport frame 20. The blade is lying substantially horizontally with its chordwise extent at a mid-portion 7 thereof also directed in a generally horizontal direction. In the embodiment illustrated, the free end of a closed clamping arm 40 reaches across the blade longitudinal main axis and extends approximately half way across the chordwise extent of the blade in the tip saddle assembly 50. An operator in an operating position 24 on a platform 25 in the tip transport frame 20 is able to reach all the relevant controls for installing or releasing a blade 1 into or from the frame.

As shown in FIG. 5, a root saddle assembly 80 may be provided in a root frame 10 of a frame pair. The root saddle assembly 80 is in particular preferably connected to the root frame 10 in such a way that translation movement of the root saddle assembly 80 relative to the root frame 10 is excluded. A root saddle 82 may be configured with a support surface shaped to conform to the shape of a blade surface at its root. The root saddle 82 may thereby appropriately have an arcuate blade root support surface. The root saddle assembly 80 may include clamps or clamp attachments or other fittings for securely holding the blade root in the root saddle 80.

These may be in the form of brace attachments and/or in the form of root restrainers. Root restrainers may in particular be configured to be attached to stud-bolts protruding from a blade root and thereby prohibit longitudinal movement of a blade 1 in a root frame 10.

In accordance with aspects of the invention, it is preferred for the root frame 10 of a pair to have an effective length $L_r$ greater than the effective length $L_t$ of the tip frame 20. In this context, the effective length of a frame 10, 20 may correspond to the distance between the most proximal surface of a proximal upright strut 72, 92 and the most distal surface of a distal upright strut 71, 91. Still preferably, the effective length $L_r$ of the root frame 10 of a frame pair may be at least twenty percent greater than the effective length $L_t$ of the tip frame 20. Still preferably, the effective length $L_r$ of the root frame 10 of a frame pair may be at least thirty percent greater than the effective length $L_t$ of the tip frame 20. Still preferably, the effective length $L_r$ of the root frame 10 of a frame pair may be at least forty percent greater than the effective length $L_t$ of the tip frame 20. The stability of a root frame 10 or root frame stack may thereby be further enhanced. Moreover, the overall stability of a frame pair or of stacked frame pairs may thereby be enhanced owing to the increased propensity for load dissipation through the root frame 10 or root frame stack while underway. The larger lengthwise dimension of a root frame may furthermore reduce the need for lashings between a transport surface and a root frame 10 or root frame stack. In this context, it may be appreciated that the internal volume defined by a tip frame 20 may preferably be at least twenty percent less or at least thirty or forty percent less than the internal volume defined by a root frame 10.

Also visible in the tip frame 20 and root frame 10 illustrated in respective FIGS. 3 and 5 is a retractable arm assembly 140 positioned, according to the illustrated embodiment, at a corner 17 of a frame, in particular at a bottom portion 75, 95 of the respective frame. Also visible in these figures is a clamping claw arrangement 160 positioned, according to the illustrated embodiment, at a corner 17 of a frame, in particular at a top portion 76, 96 of the respective frame. It is within the scope of the invention for the positions of these elements, notably the retractable arm assembly 140 and the clamping claw assembly 160 to be inverted, namely for a retractable arm assembly 140 to be positioned at a top portion 76, 96 of the respective frame, whereas the clamping claw assembly 160 may be positioned at a bottom portion 75, 95 of the respective frame. In embodiments frame 5, may have some retractable arm assemblies at top portions 76, 96 thereof and some at bottom portions 75, 95 thereof. Correspondingly, in these embodiments frame 5, may have some clamping claw arrangements at top portions 76, 96 thereof and some at bottom portions 75, 95 thereof. Ideally, top and bottom portions of upright frame struts may be provided with corresponding claw arrangements or arm assemblies so that similar frames are engageably stackable.

Preferably, frames 5 may be stacked atop each other by placing a foot 12 of a first frame A atop a shoulder 14 of a second frame B.

Figure 6A:
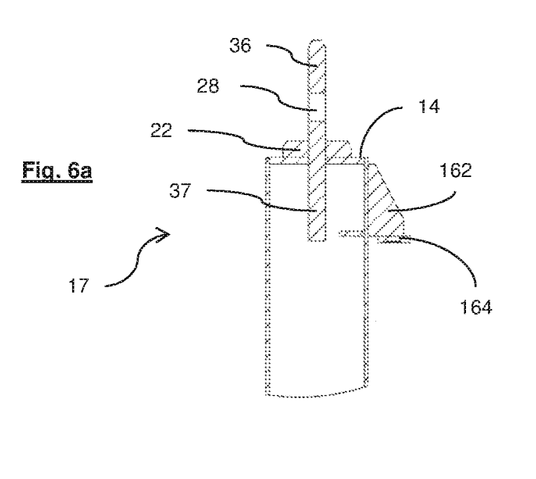
FIG. 6a shows a section view through a top corner of a frame.
Figure 6B:
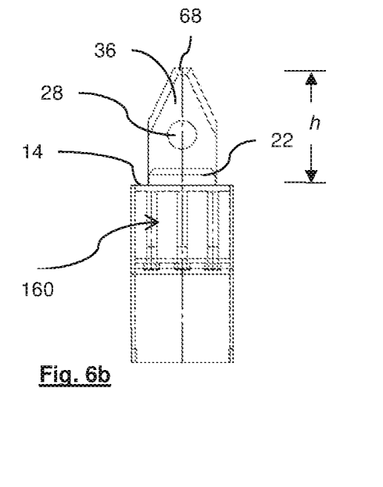
FIG. 6b shows a front view of some features at a top corner of a frame.
Figure 10:
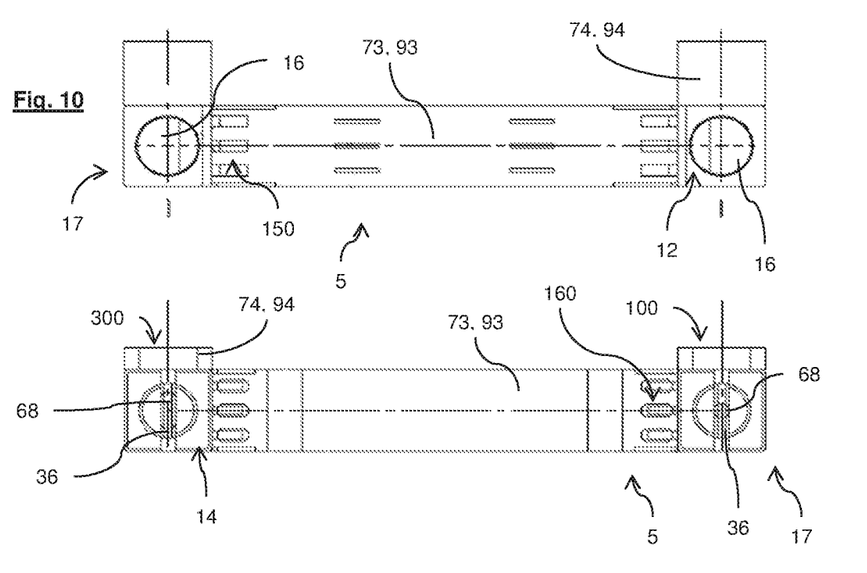
FIG. 10 shows some details of a frame foot region and a frame shoulder region.
Figure 11:
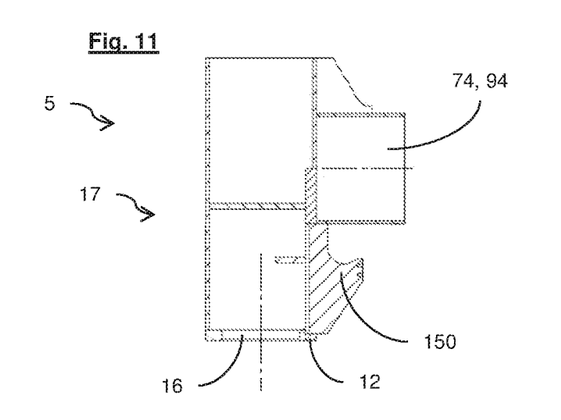
FIG. 11 shows a cross section views of some details at a frame foot showing recesses therein and hinge blocks.

As can be seen from FIG. 6a or 6b, a locating finger 36 may be provided preferably at each shoulder 14 of a tip and/or root transport frame 20, 10. The locating finger 36 may be elongate, extending in height h from said shoulder 14 to a truncated tip 68 having a small dimension in particular in relation to a recess 16 in a frame foot 12. A bevelled edge may further improve the locating properties of the locating finger 36 in a frame foot recess 16. Preferably each shoulder 14 is provided with such a locating finger 36. With reference to FIG. 10 or FIG. 11, the locating finger 36 is configured to easily locate itself in a recess 16 at a foot of a transport frame 5. The top illustration in FIG. 10 shows a partial view of a root or tip transport frame 5 from underneath, with the foot portions 12 thereof clearly visible, as well as a recess 16 at each foot 12. Also a hinge block 150 is visible, this will be explained further below with reference to FIG. 14. In FIG. 10, two corners 17 are shown, joined by a longitudinally extending strut 73, 93. In the lower figure, a top view of a part of a frame 5 is shown, showing its shoulder portions 14 with locating fingers 36 respectively in place thereon. One locating finger is longer than the other, as may be seen from the indicated size of the respective tips 68, the leftmost of which has a larger truncation than the one on the right hand side. Also visible in the lower figure in FIG. 10 is a clamping claw arrangement 160 discussed in more detail below. FIG. 11 illustrates how a recess 16 in a frame foot 12 allows access from beneath the foot 12 into an interior region of a frame corner 17.

Figure 8:
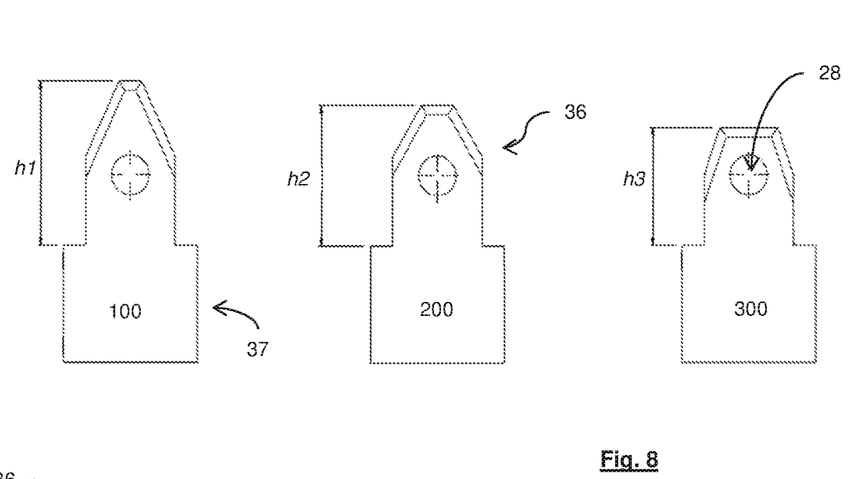
FIG. 8 shows relative dimensions of locating fingers.
Figures 12, 12A:
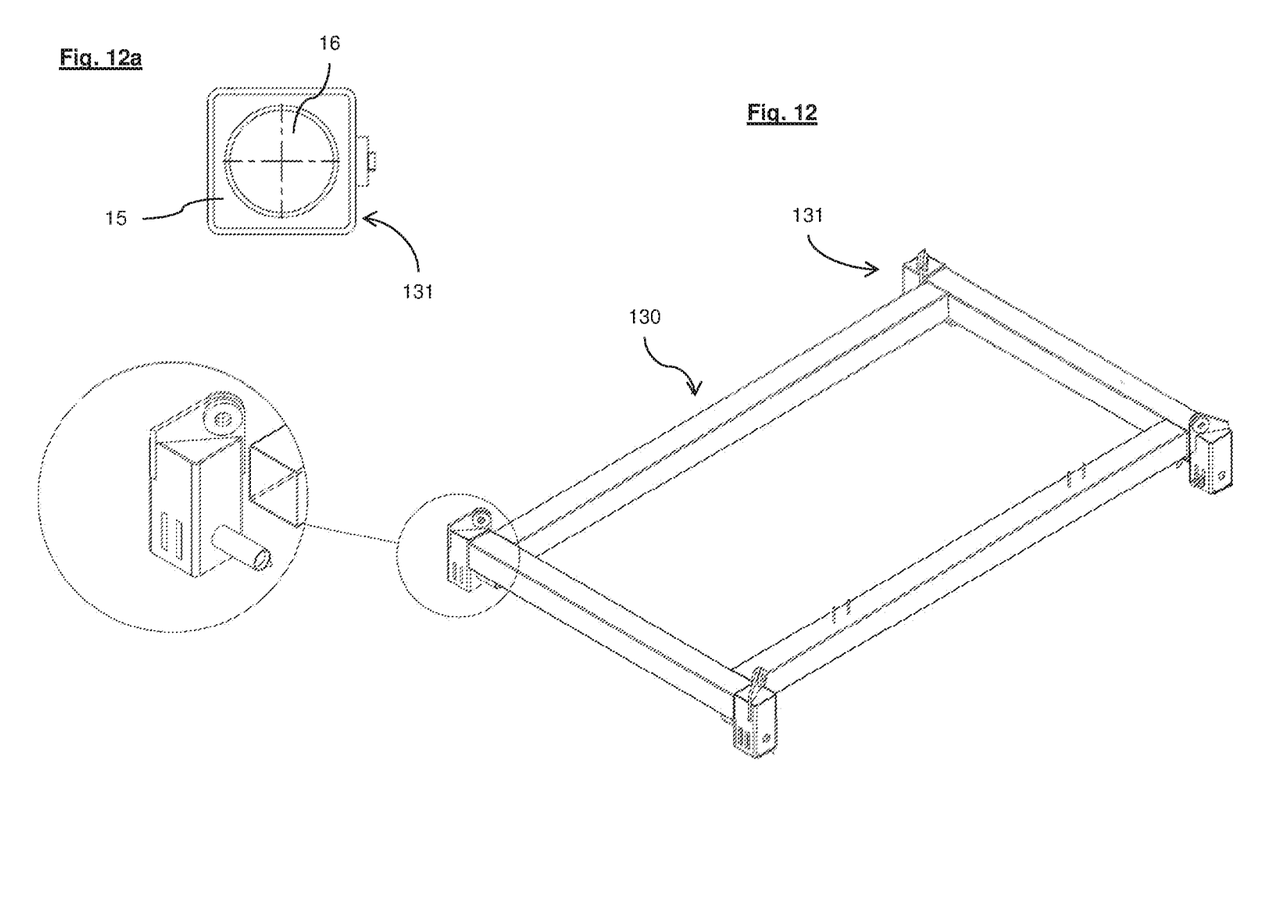
FIG. 12a shows a detail of a lifting yoke.
FIG. 12 Shows aspects of a lifting element configured for engaging a frame.
Figure 13:
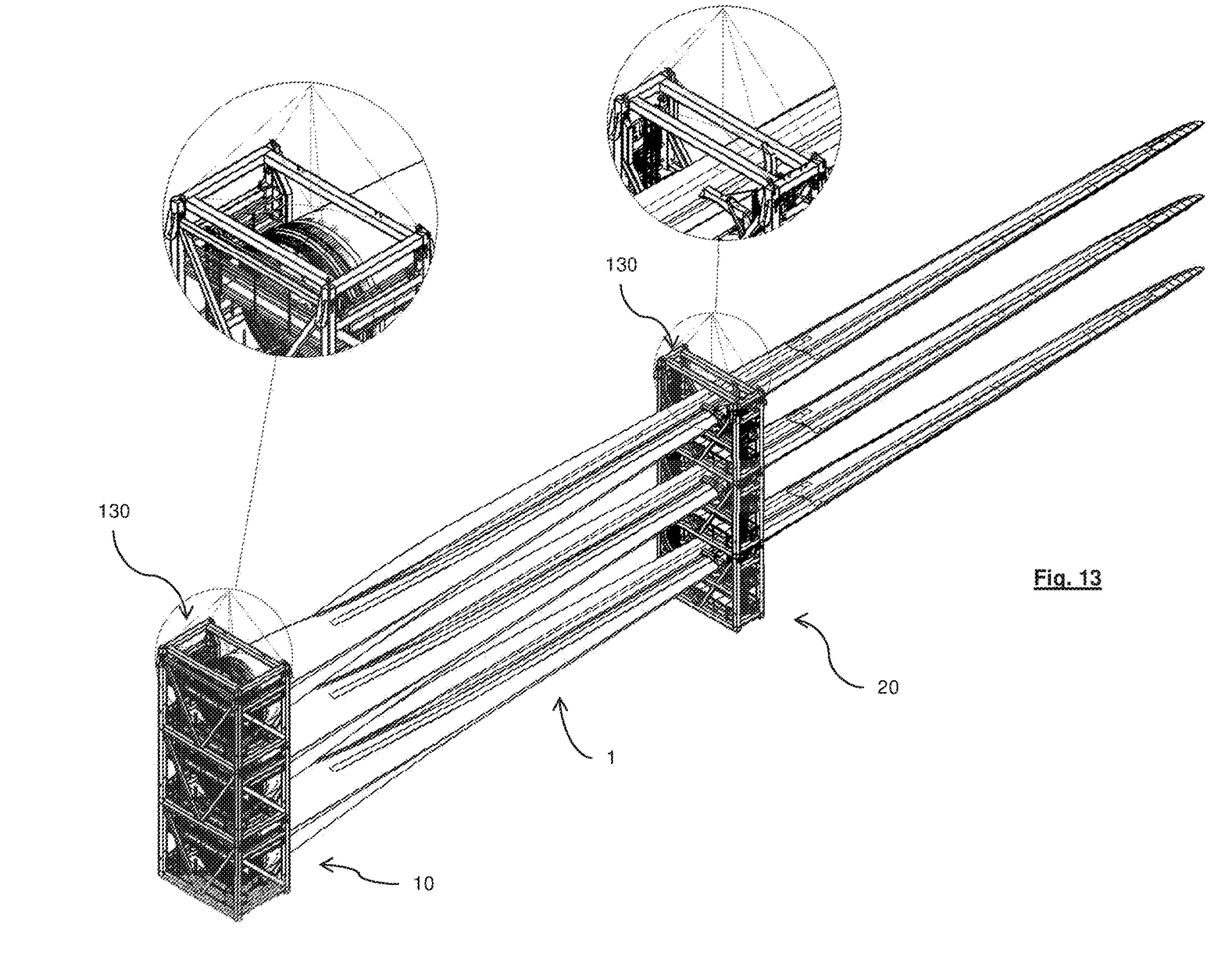
FIG. 13 shows a aspects of a lifting operation at a stack of blades in transport frames.

With reference to the three locating fingers 36 illustrated in FIG. 8, a first locating finger 36, numbered 100 has a height h1 greater than the heights of the other two. According to aspects of the invention, one of the locating fingers 36 atop a shoulder 14 may have a maximum height h1. This contributes to ease of stacking of a second frame A over and with its foot 12 in engagement with a shoulder 14 of a first frame B. The tip 68 of finger 100 will, when a first frame is lowered over a second frame, reach into the relevant recess 16 without needing to be co-ordinated at the same time with other locating fingers 36 or recesses. It is thereby easier to correctly locate a frame 5 to be lowered in place than with all or more than one locating finger having an equal length. Remaining locating fingers 36 may all be of a same height h or, as in another aspect of the invention, a second locating finger 36, marked in FIG. 8 with the number 200 may have a height h2 less than the height h1 of a first locating finger 100 and greater than the height of further locating fingers 36 at the frame 5. In particular third and fourth locating fingers 36 marked 300 in FIG. 8 may have a lower height h3, preferably being a minimum height at any frame shoulder 14. In use the second highest locating finger 200 may facilitate final positioning of a first frame to be stacked over a second frame, unimpeded by remaining, shorter locating fingers 300. As may be seen from FIG. 12, a similar method may be employed when lowering a lifting element 130 onto a frame for securing it prior to a lift. The method works especially well with a rigid lifting element such as a spreader or yoke (as illustrated). Preferably, each connecting piece 131 illustrated in FIG. 12 as a corner post of a yoke, may have a base 15 capable of resting on a shoulder 14 of the frame 5 when the locating fingers 36 at said frame are inserted in the recesses 16 in the base 15 of the connecting pieces 131 of the lifting element. FIG. 13 shows additional aspects of a lifting operation using a lifting element at the locating fingers 36 of a topmost transport frame in a stack.

Also visible in FIGS. 6a and 6b and FIG. 8 is the optional, general tongue-shape of the locating finger 36 in that portion which extends above a shoulder 14. The preferred shape of the anchor portion 37 may also be generally tongue-shaped. While the top part h of a locating finger 36 may have a width configured to fit within the circumference of a recess 16 at a blade frame foot 12, the anchor portion 37 may instead have a width which is configured to the dimensions of a transport frame upright strut, 71, 72, 91, 92. In embodiments, a locating finger 36 and its anchor portion may be made from a single piece of material. In embodiments, the locating finger 36 and its anchor portion may be made from a single plate of material. In embodiments, the locating finger 36 and its anchor portion may have a substantially uniform thickness. The term substantially uniform thickness in this context does not exclude minor elements of bevelling or perforations or other details, e.g. for interconnection purposes. In the example shown in FIG. 6a also in connection with FIG. 8, a locating finger 36 and its anchor portion 37 may together have the general configuration of a single plate, i.e. preferably a flat, planar configuration. In aspects, as suggested in FIG. 8, a guide plate 36 and its anchor portion 37 may be generally tongue-shaped with a stepped shoulder portion between the anchor portion 37 and the guide plate portion 36. A locating finger 36 may be combined with a raised abutment 22 or may be implemented independently thereof. A locating finger 36 may be tongue-shaped and may have a generally truncated point. It may also provide, combined with an abutment 22, some additional, limited lateral stability to a frame stack although this is not their primary purpose. Preferably, a locating finger 36 may comprise a lifting point 28 capable of supporting the weight of a blade transport frame 5, in particular when two or more such locating fingers 36 are provided per blade frame 5. As shown in the illustrated embodiments, a lifting point 28 may be provided by way of a hole in a locating finger 36. The primary purpose of the lifting points 28 in the locating fingers 36 is to enable a blade frame 5 or a stack of blade frames to be picked up from above using a lifting element 130 which engages with the locating fingers 36. This avoids the need for a lifting operation to additionally require connecting elements such as a connector arm 142 or clamping claws 162. This is preferred because the secure engagement offered by the connector arms 142 is aimed primarily at maintaining a secure, stacked configuration of blades 1 in blade frames 5 during transportation and also allowing stacked frames to be picked up as a stack by lifting equipment such as a crane. This can greatly speed up the process of loading onto a vessel or other transport platform, or unloading from the same. Moreover, the placement of lifting element 130 which may be any suitable lifting element such as yoke or spreader or sling or the like, may be made considerably quicker by enabling its attachment to the locating fingers 36. Since the lifting of a blade frame or stack of blade frames does not generally impart lateral forces to the relevant frame, it is possible to lift even the considerably weight of a stack of blades using the locating fingers 36. Preferably, in embodiments, a locating finger 36 may be configured with an anchor 37 which extends inside the blade frame shoulder 14, below the level of the shoulder 14. This arrangement may give additional strength for a lift, especially of a stack of blades 1 and frames 5. Therefore, a further advantage of the retractable arm connectors 142 and clamping claw 160 arrangements of the present invention is that they allow both secure transportation and also lifting of stacked frames without needing additional binding, connection or lashing.

Figure 14:
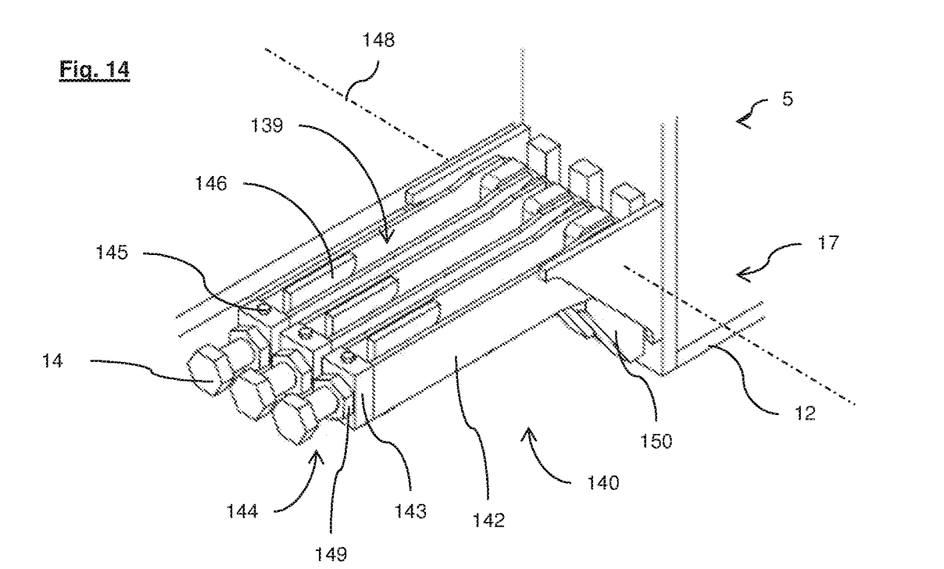
FIG. 14 shows a perspective cutaway view of a connector assembly.

In further aspects, remaining frames of a stack may be connected together using a stacking connector arrangement 140. In embodiments, a stacking connector may comprise a retractable arm 142 at one frame 5 and a co-operating clamping claw 162 at an adjacent frame in a stack. FIG. 14 shows an example of how a retractable arm arrangement 140 may be configured. The illustration shows a gang arrangement of three retractable arms 142, all hinged at a hinge body 150 and hingeably pivotable about hinge axis 148. In the example shown, the hinge axis may extend substantially parallel to transverse direction W of a blade 1 or frame 5. A retractable arm arrangement may nevertheless include only a single arm 142 or two arms 142 or more than three. In FIG. 6, the arms 142 are all shown in a retracted position thereof.

In FIG. 14, the arms 142 are all shown in a retracted position thereof. In this position, the arms 142 may be secured at a catch 146 fixed to a portion of a blade frame 5 which, for illustrative purposes is not shown. Suitably, a catch 146, or a set thereof may be located at a transverse or longitudinally extending frame strut 74, 94, 73, 93, not shown in FIG. 14.

An arm 142 may extend along a longitudinal axis between a hinge point at one end and a connection portion at the other. In the example shown, an arm 142 may have a tensioner 144 for secure engagement with a clamping claw 162 and preferably for imparting tension force to a connection between adjacent frames 5, tending to pull these securely together. In the example shown, a tensioner 144 may comprise a longitudinal bolt 147 which may pass threadably through push plate 143. A rotation of the tension bolt 147 may thereby move the bolt in an engagement or release direction of the releasable arm 142. In the illustrated embodiment, the tensioner engages with the catch 146 to hold the arm 142 against the action of gravity suspended in a substantially horizontal orientation. In order to prevent dislodging of the arm 142, for example under the action of shocks or vibrations, a counternut 149 of the tensioner 144 may be provided and optionally also a locking nut 145. In a retracted position, there may be no need to apply considerable tension to the arms 142. Modest tension will suffice.

In aspects of the invention, a retractable arm 142 may comprise two longitudinally extending plates joined together at a hinge end and at a distal end. A hinge end thereof may include a hinge element which may be receivable in a hinge block 150. A distal end thereof may comprise a push plate 143 which may serve to connect together said distal ends of the opposing blades of an arm 142. In aspects, a catch 146 or a clamping claw 162 may be positioned between said two opposing plates in a respective engagement or retracted position of an arm 142. Thereby, a tensioner 144 acting on the push plate 143, in particular through the same, may securely abut against respectively a retaining surface of said catch 146 or against an anvil surface of said clamping claw. Alternatively, a connector arm 142 may comprise a cavity 139 into which a claw 162 or retainer 146 may be received. In embodiments, the opposing plates of an arm 142 may define a cavity 139.

Figure 7:
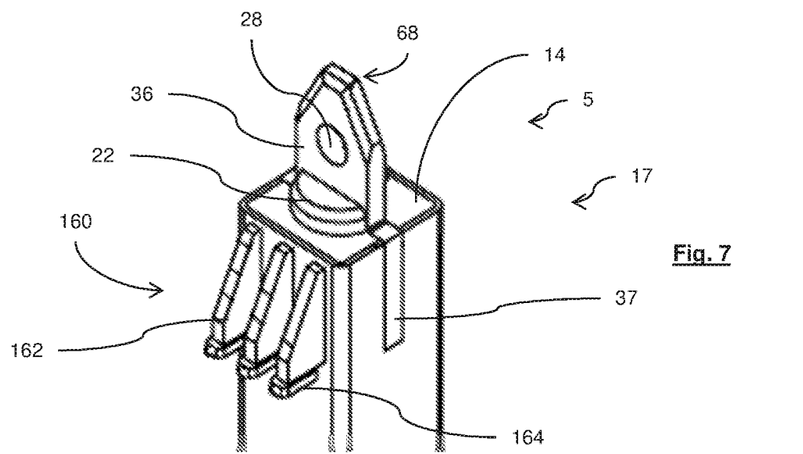
FIG. 7 shows a perspective view of a frame shoulder.

Conversely, at the opposite end of a same frame strut, and as illustrated in FIG. 7, there may be provided a clamping claw arrangement 160. In the example shown the arrangement 160 also comprises a gang of claws 162 which in the case illustrated is three claws. These are configured to co-operate respectively with the three arms 142 of a retractable arm assembly 140. The invention also encompasses embodiments in which a clamping claw arrangement 160 includes only one or two said claws 162 or more than three. Each clamping claw 162 preferably comprises a landing point or anvil 164 configured to co-operate with a tensioner at a retractable arm 142. In embodiments, it may be envisaged to provide a tensioner at a clamping claw and a corresponding anvil 164 or landing point at a retractable arm 142. The clamping claws 162 of a clamping claw arrangement 160 are preferably especially shaped to engage with a tensioner 144 at a retractable arm and to provide secure engagement therewith while sustaining a high level of tension imparted by action of the tensioner 144.

Figure 9:
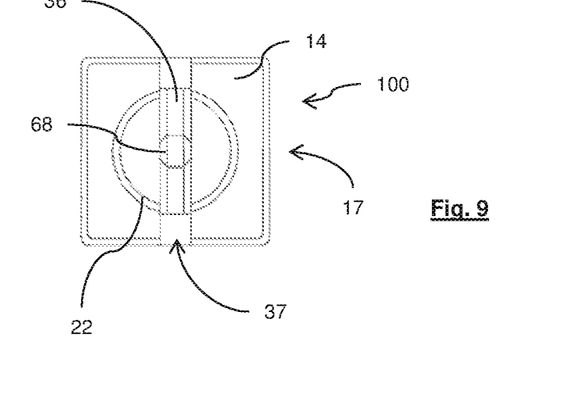
FIG. 9 shows a top view of a frame shoulder illustrating some particular features.

In FIG. 11, there is shown some detail of a hinge body 150 which in particular allows easy insertion of retractable arms 142 while at the same time providing a secure anchor point under tension applied by the tensioner 144. In FIG. 9b there is additionally shown a seat 165 in the form of a recess for securely receiving the end of a tensioner 144.

Figure 15:
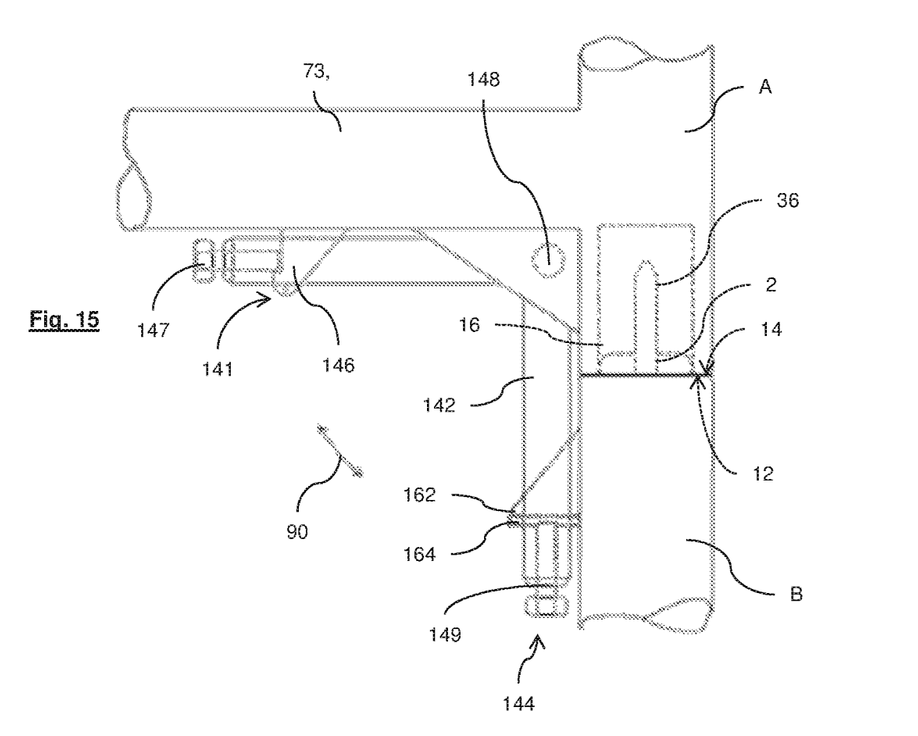
FIG. 15 shows an illustrative view of exemplary retractable arms during use in a frame stack.

The mode of operation of the arrangement is illustrated in FIG. 15, in which one retractable arm 142 of an arm assembly 140 is shown retracted while the other is shown engaged in a clamping claw arrangement 160. A first frame 'A' is placed atop a second frame 'B' such that the foot 12 of the first frame 'A' rests on the shoulder 14 of the second frame 'B'. This may be carried out while all connector arms 142 are in a retracted position, preferably at a respective catch 146. For added safety, a split pin or other locking element maybe passed through a catch 146 at a locking hole 141 therein to prevent accidental fallout from a retracted position. An operator may loosen the tightener 144 at a first retractable arm 142 at a corner 17 said first frame 'A'. It may be necessary first to loosen or remove locking or blocking elements such as any split pins or lock nuts 145. The arm 142 may then be swung about its hinge axis 148 in the direction of arrow 90 into approximate engagement with a corresponding clamping claw 62 in a claw arrangement 160 at corner 17 of a the adjacent, second frame 'B'. Tension may be applied to the tensioner 144, in this case comprising a threaded bolt 147 passing through a push plate of the retractable arm 142. An operator may do this by simply turning the bolt 147 in a tightening direction, preferably using only hand tools. Access by an operator to the relevant part of a frame 5 may be ensured by providing appropriate platforms 25. Tightening may best be carried out by first loosening the counternut 149 and loosening any other locking nut 145. The tension bolt 147 may be tightened fully against the clamping claw 162, preferably against an anvil 164 thereof and preferably engaging with a recess 165 therein. Thereafter, a counternut 149 may be tightened and a lock nut 145 may optionally also be applied. Thereafter, a second and any subsequent retractable arm 142 may be swung into engagement in the same way. Optionally, the steps of securing a tightener 144 using a counternut 149 and/or a lock nut 145 may be left until all the arms 142 at a relevant assembly 140 have been tensioned in position at a corresponding clamping claw. An operator may thereby carry out successive re-tightening and balancing operations to ensure that a high level of tension is applied at each arm 142 and preferably that the level of tension at each arm 142 is approximately equal. A torque wrench may be used. In any case, the operation is complete when all relevant arms 142 at each arm assembly 140 in a set of stacked frames are connected, tightened and secured. In this condition, the frames 5 may be transported by any suitable means with, preferably, a reduced amount of lashing by virtue of the enhanced tension connection between adjacent frames in a stack.

In additional aspects, as illustrated in FIGS. 6, 7, 9, 11 and 15, there may be provided a raised abutment 22 atop one or more shoulders 14 of a transport frame 5. The raised abutment 22 may co-operate with a recess 16 in a frame foot 12. This arrangement may provide additional stability when the frames 5 are stacked. In the illustrated embodiments, the abutment 22 may have a circular shape although any shape will be usable, provided that the abutment 22 and recess 16 are complementary. A locating fit between the abutment 22 and a recess 16 may be sufficient although it may be preferred, in embodiments, to provide a close tolerance fit in order to assist in resisting shear stresses incident on the frames during transport.

FIG. 15 illustrates an alternative embodiment in which a locating finger 16 at a shoulder 14 of a second frame 'B' projects inside a recess 16 in a foot 12 of a first frame 'A'. As can be seen in FIG. 15, the tolerance between an abutment 22 and a recess 16 internal dimension is larger than the tolerance illustrated in the stacked frames in FIG. 10. The term retractable does not necessarily imply retractability in a vertical direction although this is one possibility and has been illustrated. Preferably the term retractable implies the capability to be moved between an engagement position and a retracted, non-engagement position in relation to a catch such as clamping claw. FIG. 13 illustrates figuratively a lifting operation of a stack of blades 1 in their root and tip frame pairs 10, 20. The stacked frames are connected using retractable arm arrangements 140 as described herein, while the topmost frame of each stack is quickly and easily connected to a lifting element 130, shown as a yoke, by means of locating fingers 36 atop each shoulder of each tip and root frame 20, 10.

The examples illustrated herein show a variety of optional features not all of which need to be combined together in the context of the invention. On the other hand, all and any recited features may be combined together unless prevented by the laws of physics or unless manifestly impossible for another reason.

The invention claimed is:

1. A transport frame having a longitudinal, lateral and upright extent, and configured for transporting a root end or tip portion of a longitudinally extending wind turbine blade, said frame being stackable with a similar adjacent transport frame, said transport frame comprising:

four upright frame struts which together define a generally cuboid internal space, each upright frame strut having a top shoulder and a foot, each foot being conformed to be stackable on a corresponding shoulder of said similar adjacent transport frame,
wherein each said shoulder is provided with a locating finger centrally positioned on said shoulder such that said locating finger projects a height from said shoulder along a longitudinal axis of said upright frame strut, wherein each locating finger has an anchor portion that extends below said shoulder and into said upright frame strut of said frame, wherein each said foot is provided with a recess conformed to receive a corresponding locating finger of said similar adjacent transport frame, and
wherein a first said locating finger has a height greater than the height of each of the three remaining said locating fingers.

2. The transport frame according to claim 1, wherein a second said locating finger, has a height less than the height of said first locating finger, and greater than the height of each of the two remaining said locating fingers.

3. The transport frame according to claim 2, wherein said first and said second locating fingers are arranged at the shoulders of diagonally opposite ones of the upright frame struts of said frame.

4. The transport frame according to claim 1, wherein each said finger is provided with a lifting aperture configured as a load bearing lifting point for lifting said frame or a stack of said frames.

5. The transport frame according to claim 1, wherein said locating finger includes a raised abutment proximate to a base of said locating finger.

6. The transport frame according to claim 5, wherein said recess is configured to receive said finger and said abutment and wherein said recess has a mouth conformed to said abutment.

7. The transport frame according to claim 1, said frame additionally including a stacking connector configured for locking stacked frames together, said stacking connector being additional to and separate from each said locating finger and each said recess.

8. The transport frame according to claim 7, wherein said stacking connector comprises a retractable arm arrangement pivotably coupled to the transport frame proximate one or more top or bottom corners of the transport frame, and wherein said frame further comprises, positioned on the transport frame proximate at least one or more top or bottom corners thereof, a clamping claw arrangement;
wherein when the transport frame and the adjacent transport frame are in a stacked arrangement, said retractable arm arrangement is configured to fixingly engage a corresponding claw arrangement on the adjacent transport frame to thereby secure the transport frame to the adjacent transport frame.

9. The transport frame according to claim 8, wherein the retractable arm arrangement includes a tensioner capable of creating a fixed engagement between the retractable arm arrangement and clamping arrangement when under tension.

10. The transport frame according to claim 8, wherein said retractable arm arrangement comprises a gang of two or more retractable arms and wherein said clamping claw arrangement comprises two or more clamping claws.

11. The transport frame according to claim 10, wherein each retractable arm of said retractable arm arrangement is individually movable into engagement with a corresponding clamping claw of said clamping claw arrangement.

12. A method of stacking a wind turbine blade transport frame according to claim 1, said method including positioning said frame on a surface and lowering said adjacent frame from above it, positioning the adjacent frame over said frame by bringing said first locating finger of said frame into engagement with a first said recess at a foot of said adjacent frame and thereafter bringing remaining said locating fingers of said frame into engagement with remaining corresponding recesses of each foot of said adjacent frame.

13. The method according to claim 12, said frame further including a second locating finger having a height less than the height of said first locating finger and greater than the height of each of the two remaining said locating fingers, the method further including positioning said adjacent frame over said frame by bringing the second said locating finger of said frame into engagement with the second said recess at a second foot of said adjacent frame after said first locating finger is engaged with first said recess, and thereafter bringing remaining said locating fingers of said frame into engagement with remaining corresponding recesses of each foot of said adjacent frame.

14. The method according to claim 12, further including engaging a stacking connector of said frame with a stacking connector on said adjacent frame to thereby secure said frame to said adjacent frame in a stack.

15. The method according to claim 14, further including lifting a stack of transport frames having two, three or more frames by connecting a lifting device to a topmost transport frame of said stack and then lifting said stack, wherein each frame in each frame stack is suspended from and lifted by a frame immediately above it.

16. The method of lifting said stack of transport frames according to claim 15, wherein each said finger of each said transport frame is provided with a lifting aperture configured as a load bearing lifting point for lifting said stack of frames, each frame comprising a wind turbine blade, said method including connecting said lifting device to two or more said lifting apertures of said locating finger of said topmost transport frame and lifting said stack of frames suspended by said lifting apertures.

17. A transport frame having a longitudinal, lateral and upright extent, and configured for transporting a root end or tip portion of a longitudinally extending wind turbine blade, the frame being stackable with similar frames,
the frame having four top shoulders and four feet, the feet of the frame being conformed to be stackable on corresponding shoulders of another similar frame,
wherein each shoulder is provided with a locating finger that projects a height from the shoulder, and wherein each foot is provided with a recess conformed to receive each locating finger, and
wherein a first locating finger has a height, and a second locating finger has a height less than the height of the first locating finger but greater than the height of each of the remaining locating fingers.

18. A transport frame having a longitudinal, lateral and upright extent, and configured for transporting a root end or tip portion of a longitudinally extending wind turbine blade, the frame being stackable with similar frames,
the frame having four top shoulders and four feet, the feet of the frame being conformed to be stackable on corresponding shoulders of another similar frame,
wherein each shoulder is provided with a locating finger that projects a height from the shoulder, and wherein each foot is provided with a recess conformed to receive each locating finger,
wherein a first locating finger has a height greater than the height each of the remaining locating fingers, a stacking connector configured for locking stacked frames together, the stacking connector being additional to and separate from each locating finger and each recess, wherein the stacking connector comprises a retractable arm arrangement positioned on the transport frame proximate one or more top or bottom corners of the transport frame, and wherein the transport frame further comprises, positioned on the transport frame proximate at least one or more top or bottom corners thereof, a clamping claw arrangement, and wherein when the transport frame and similar frame are in a stacked arrangement, the retractable arm arrangement being configured to fixingly engage a corresponding claw arrangement on the similar frame to thereby secure the transport frame to the adjacent transport frame.

* * * * *